INVENTOR
MAMORU ISHIWATA

BY Semmes & Semmes
ATTORNEYS 3,425,951
DEFOAMING APPARATUS
Mamoru Ishiwata, Minami-Ashigara-Machi, Japan, assignor to Fuji Shashin Film Kabushiki Kaisha, Minami-Ashigara-Machi, Ashigara-Kamigun, Kanagawa, Japan
Filed Mar. 21, 1966, Ser. No. 537,624
U.S. Cl. 252—361
Int. Cl. B01d 19/02
1 Claim

ABSTRACT OF THE DISCLOSURE

Apparatus for ultrasound removal of foam from liquids, such as photographic emulsions, so as to avoid pin holes in the emulsion.

---

The present invention relates generally to an apparatus for deforming liquids. More particularly, this invention relates to an apparatus used for eliminating fine foams contained in liquids, such as photographic emulsions, back layer solutions, protective layer solutions, subbing layer solutions, filter layer solutions and masking layer solutions, hereinafter referred to an an emulsion or coating liquid.

In applying a photographic emulsion to a support, fine foams contained in the emulsion should be completely eliminated prior to the application, since the foams remain in the coated layer as pinholes after applying and drying the emulsion. In the particular case where the projection or enlargement is necessary, as in photographic cine-films or amateur photographic films, this requirement will be enlarged.

In order to eliminate fine foams contained in photographic emulsions, there have hitherto been adopted a natural defoaming method wherein the emulsion is allowed to stand for a long period, or a vacuum defoaming method.

In such manner, however, a large capacity tank plant is required, such as a defoaming tank or stock tank, resulting in large space requirements. Furthermore, a long period of time is required for defoaming, particularly a thickened or viscous photographic emulsion. Because of this, some counterplans should be provided for the deterioration in the characteristics of the photographic emulsion which results in great difficulties for the continuous operation.

It has been well known up to this time that ultrasonic waves exhibit a defoaming effect and is adapted to molten metals in metal casting and plating. However, the shape of apparatus, the strength of ultrasonic wave energy and the frequency thereof in such known devices are unsatisfactory for eliminating effectively fine foams contained in photographic emulsions without damaging the characteristics thereof.

The present improved defoaming apparatus is to be used for the purpose of eliminating fine foams contained in various liquids, particularly photographic emulsions, effectively and continuously by the application of ultrasonic waves without damaging the characteristics of the photographic emulsions.

Accordingly, an object of the present invention is to provide an apparatus for eliminating fine foams contained in various liquids, particularly photographic emulsions, whereby the aforementioned problems can be eliminated and continuous processing be made feasible.

Another object of the present invention is to provide an improved defoaming apparatus for photographic emulsions wherein the defoaming action of ultrasonic waves is utilized.

Figure 1:
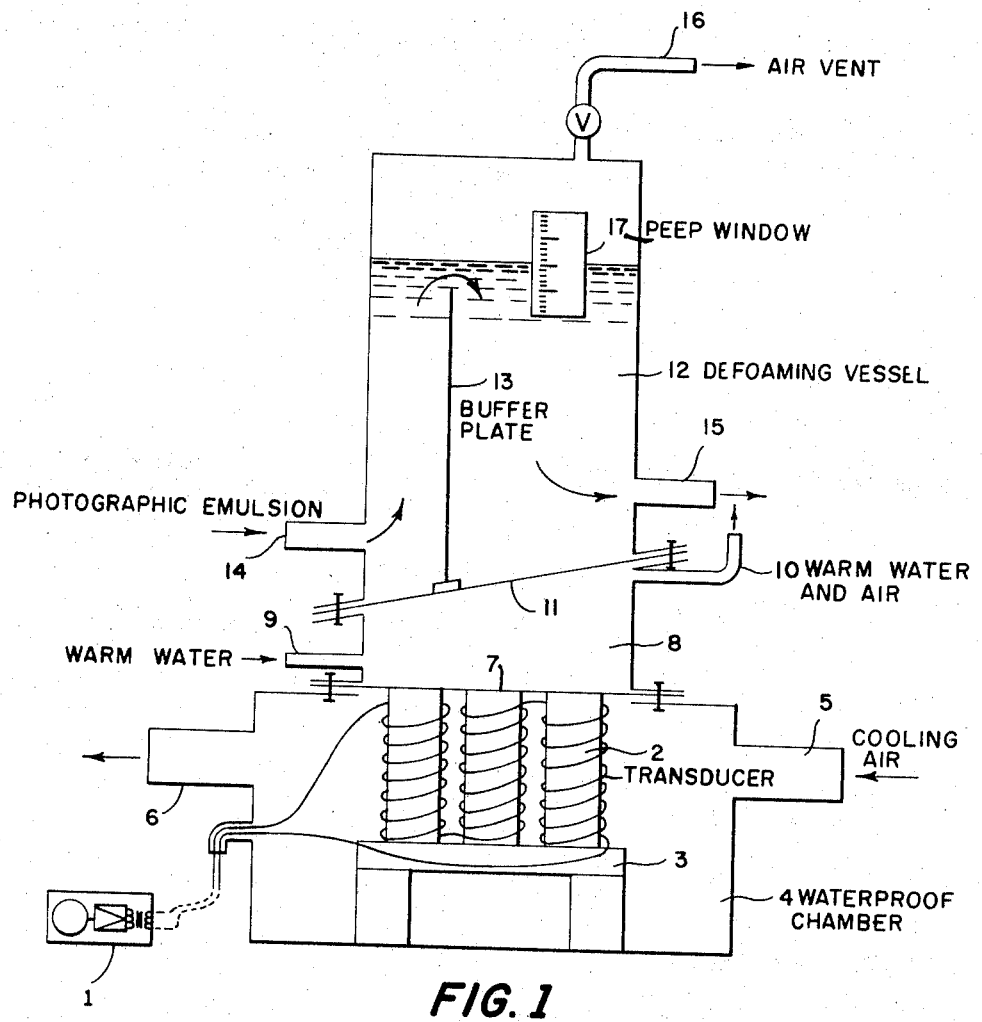
Figure 2:
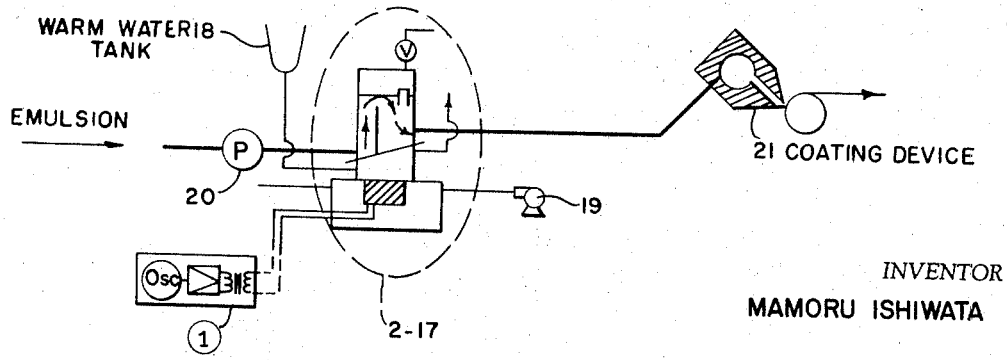

Other objects of the present invention will become apparent from the ensuing specification and attached drawings, wherein:

FIG. 1 is a cross-sectional view showing an embodiment of the present invention; and FIG. 2 is a schematic view showing a practical application of the present invention to photographic coating step.

In FIG. 1, an ultrasonic wave generating apparatus 1 of the electron tube type is provided with a first fine control means for oscillation of frequencies and a second control means for ultrasonic wave output. A magnetostriction type ferrite transducer 2 is attached to partition plate 7, composed of stainless steel AISI 430 having a similar thermal expansion coefficient to that of a transducer, by a binding agent such as high temperature araldite, and supported by a sonic insulating material such as a sponge or a foamed rubber at the non-adhered side. A water proof type transducer chamber 4 is provided with an inlet 5 and an outlet 6 for conducting air for cooling the vibrator. A warm chamber 8 is filled with flowing warm water for receiving the ultrasonic wave energy from partition plate 7 and transmitting it to a photographic emulsion in chamber 12 through a bottom plate 11 provided with inlet 9 and outlet 10 for warm water, the warm water outlet 10 being arranged at the uppermost portion of the chamber so as to prevent hindrance of the transmission of ultrasonic wave energy to the residence of foams in the warm water chamber. Chamber 12, as disclosed in the present embodiment of invention, may be a closed defoaming vessel provided with an inlet 14 and an outlet 15 for the photographic emulsion in which the photographic emulsion flows continuously, receives radiation of ultrasonic wave and removes fine foams contained therein towards the surface.

Bottom plate 11 is composed of a material having a good corrosion resistance to the photographic emulsion, such as stainless steel AISI 316L for example, and is preferably fitted in inclined fashion towards warm water outlet 10 so as to prevent the accumulation of foams in the upper portion of warm water chamber 8. Reference numeral 13 designates a buffer plate which changes the flow direction of the emulsion introduced upwardly from inlet 14 and prolongs the passage for the emulsion to be defoamed, as well as facilitating the floating of foams. The top of chamber 12 is provided with air vent 16 which is used to charge at first the emulsion in the defoaming vessel or to exhaust foams accumulated in the upper portion thereof out of the vessel. A peep window 17 is provided for observing the level of the emulsion in the defoaming vessel controlled by air vent 16. Window 17 is provided with a shield cover to prevent the photographic emulsion from exposure to light. The chamber 12, buffer plate 13, inlet 14, outlet 15 and air vent 16 are preferably made of material having a high resistance to photographic emulsions, such as AISI 316 in bottom plate 11.

The general operation is further illustrated referring to FIG. 2, wherein the defoaming apparatus as shown in FIG. 1 is used for defoaming photographic emulsions.

First, warm water is fed to the intermediate chamber 8 from warm water tank 18 and air for cooling the vibrator is introduced into the vibrator chamber 4 by means of blower 19. Then, ultrasonic wave generator 1 of the electron tube type is operated to excite transducer 2, while the ultrasonic wave output and resonance frequency are controlled. The air vent 16 being opened and the emulsion outlet 15 being closed, an emulsion is fed to the defoaming vessel 12 by pump 20. After a part of the emulsion containing many foams at the initial period of feeding is withdrawn through the air vent 16, the emulsion outlet 15 is opened to lower the level in the defoaming vessel to a predetermined position within the peep window 17 and then the air vent 16 is closed. Thus, after the flow of the emulsion to coating device 21 through the defoaming vessel becomes stationary, the ultrasonic wave output and resonance frequency are controlled in optimum. The term "warm water" used in this invention means not only water but also suitable liquids having low corrosive property.

In the present invention, a transducer for generating ultrasonic waves of the magnetostriction and electrostriction type may be employed and the resonance frequency is adjusted to 10–100 kc./sec., preferably 20–50 kc./sec.

Moreover, in the case of long run, the warm water is preferably flowed at a suitable flow rate, and if necessary, a suitable temperature control means may be provided so as to prevent rising of the liquid temperature by ultrasonic wave.

The advantages or merits obtained by adapting the deforming apparatus of the present invention to coating of photographic emulsions are as follows:

(1) Fine foams that are hardly eliminated by conventional defoaming methods can be readily eliminated, whereby pinholes are reduced in a coated and dried layer and the quality and yield for products remarkedly improved.

(2) Defoaming of highly viscous photographic emulsions can be effected, impossible in known techniques, and consequently a coating system requiring a highly viscous coating solution, for example an extrusion coating or a hopper coating, becomes applicable.

(3) Since defoamation of highly viscous photographic emulsion is possible according to the present invention, the use of more highly concentrated emulsion becomes possible, reducing the drying load to contribute the increase of coating speed.

(4) Since the continuous defoaming of a photographic emulsion in a short time becomes possible, the time for keeping a coating solution dissolved can be saved, whereby counterplans against some causes for deteriorating the characters of the emulsion, such as coating solution temperature and additive compositions, are reduced.

(5) Although a surfactant less in foaming property and excellent in defoaming property is required for prior protographic emulsions, by using the defoaming apparatus of the present invention the selection of surfactants becomes easy because its high defoaming effect places severe restrictions upon the selection of ingredients for emulsion can be softened without lowering the photographic characteristics.

(6) While the feed of a coating solution should be conducted by a constant and non-pulsed flow in a conventional coating system such as hopper coating, in the defoaming apparatus of the present invention, wherein a closed type is employed and a space is provided at the upper portion of the deforming vessel, the constant feed can be maintained by arranging this apparatus just upstream of a coating apparatus or at the downstream of a feed pump, and any pulsed flow caused by the feed pump can be diminished. Furthermore, foams produced in the feed pump and feed pipe can be eliminated just upstream of the coating apparatus.

(7) Photographic emulsions have high corrosive properties in general and, therefore, conventional adopted plates to be attached to ultrasonic wave transducers, usually stainless steel AISI 430, are corroded in a very short period of time. If a material having a high corrosion resistance, such as AISI 316 or AISI 316L, is employed as the plate in order to prevent this effect, the adhesion between the plate and transducer will be readily damaged since the thermal expansibility thereof is different from ferrite transducers. In the apparatus of the present invention, however, the warm water chamber being provided between the defoaming vessel and adhesion type transducer, the bottom plate of the defoaming vessel and the partition plate of transducer may be made of separate materials suitable for each purpose, respectively. Therefore, the corrosion by photographic emulsions and the damage of adhesion due to the difference of thermal expansibility can be prevented simultaneously.

(8) When a photographic emulsion is directly contacted with an adhesion plate for transducer, the temperature of the emulsion near the adhesion plate is raised resulting in a cause of fog and silver halide particles in the emulsion are precipitated on the surface of adhesion plate and fixed thereon by heating. In the defoaming apparatus of the present invention, however, since the warm water chamber is provided between the defoaming vessel and the partition plate attached to the transducer, the above troubles can be prevented by controlling the temperature of the warm water suitably.

(9) When ultrasonic waves are applied to a photographic emulsion, a luminescent phenomenon called "sonic luminescence" may occur at some frequency and some fog thereby formed in the emulsion. In some cases silver halide particles in the photographic emulsion may be aggregated and precipitated. In the transducer of 10–100 kc./sec. used in the defoaming apparatus of the present invention, however, such phenomenon does not occur and so the characters of the photographic emulsion are not damaged.

EXAMPLES (1) Transducer _____ Ferrite 29 kc./sec.
Output of ultrasonic wave __ 300 w.
Temp. and flow rate of warm water _____ 40° C., 0.5 l./min.
Photographic emulsion _____ For positive cine-film.
Viscosity and flow rate of emulsion _____ 50 cp. (40° C.), 3 liters/min.

(2) Transducer _____ Ferrite 20 hc./sec.
Output of ultrasonic wave __ 200 w.
Temp. and flow rate of warm water _____ 38° C., 0.5 l./min.
Photographic emulsion _____ For amateur photographic film.
Viscosity and flow rate of emulsion _____ 60 cp. (40° C.), 2.5 l./min.

(3) Transducer _____ Ferrite 40 kc./sec.
Output of ultrasonic wave __ 200 w.
Temp. and flow rate of warm water _____ 40° C., 0.5 l./min.
Photographic emulsion _____ For protective layer solution for medical X-ray films.
Viscosity and flow rate of emulsion _____ 80 cp. (40° C.), 1.0 l./min.

When the photographic emulsion subjected to one of the defoaming treatments by ultrasonic waves under the conditions as described in the abovementioned Examples 1, 2 or 3 is applied to a film base and dried, the formation of pinholes is almost completely prevented without lowering the photographic characteristics, which is compared with 50/5 cm. x 5 cm. or more in the case where such defoaming treatment is not carried out.

Manifestly, variation in structure and rearrangement of parts may be contemplated without departing from the spirit and scope of invention, as defined in the sub-joined claim.

I claim:
1. A defoaming apparatus for photographic emulsion comprising:
  (A) a waterproof type transducer chamber, including an aircooled transducer attached to a vibrating plate, said vibrating plate being made of a material having a coefficient of thermal expansion similar to that of said transducer;
  (B) a defoaming chamber having:
    (i) a bottom plate;

(ii) a vertically extending buffer plate rising from the bottom plate, said plates being made of a material having a high corrosion resistance to said photographic emulsion being subjected to defoaming treatment;

(iii) an emulsion inlet in a chamber wall proximate said bottom plate on one side of the buffer plate;

(iv) an outlet for the photographic emulsion proximate to the said bottom plate and below the upper end of the buffer plate, and in a chamber wall on the opposite side of the buffer plate from the emulsion inlet;

(v) an air vent from said defoaming chamber; and (C) an intermediate chamber formed between the defoaming chamber and the waterproof type transducer chamber and having an inlet and outlet for admitting and discharging continuously flowing non-corrosive or low corrosive liquid, said bottom plate being inclined and elevated at the intermediate chamber outlet.

References Cited

UNITED STATES PATENTS

| | | | |
|---|---|---|---|
| 2,163,649 | 6/1939 | Weaver | 259—72 |
| 2,363,247 | 11/1944 | Holder | 203—49 |
| 2,498,737 | 2/1950 | Holden | 259—1 |
| 2,585,103 | 2/1952 | Fitzgerald | 99—250 |
| 2,702,692 | 2/1955 | Kessler | 259—1 |

NORMAN YUDKOFF, *Primary Examiner.*

J. SOFER, *Assistant Examiner.*

U.S. Cl. X.R.

259—1; 96—94